United States Patent [19]
Knight et al.

[11] Patent Number: 4,845,486
[45] Date of Patent: Jul. 4, 1989

[54] RESIDENTIAL FUEL-OIL LEVEL REPORTING AND ALARM SYSTEM

[75] Inventors: John D. Knight, Nashua, N.H.; Robert D. Shapiro, North Andover, Mass.; Frank H. Banks, Wakefield, Mass.; Andrew Mitchell, Woburn, Mass.; Barry S. Sunray, Wakefield, Mass.; Robert A. DeFrancesco, Metheun, Mass.

[73] Assignee: Robert Scully, Wilmington, Mass.

[21] Appl. No.: 907,120

[22] Filed: Sep. 12, 1986

[51] Int. Cl.[4] .............................................. G08B 21/00
[52] U.S. Cl. .................................... 340/618; 340/623; 340/625; 379/106
[58] Field of Search ............... 340/618, 620, 623, 625, 340/310 R, 310 CP; 370/84, 99, 43; 331/140, 158; 371/47; 379/106, 107, 50

[56] References Cited

U.S. PATENT DOCUMENTS

| | | | |
|---|---|---|---|
| Re. 31,089 | 11/1982 | Adamson | 340/618 |
| 3,390,234 | 6/1968 | Glidden | |
| 3,553,376 | 1/1971 | Bogaart | |
| 3,588,357 | 1/1971 | Sellari et al. | |
| 3,842,208 | 10/1974 | Parkaskevakos | 379/47 |
| 3,849,771 | 11/1974 | Applin | 340/624 |
| 3,883,695 | 5/1975 | Bickel et al. | |
| 3,899,639 | 8/1975 | Cleveley et al. | |
| 3,922,490 | 11/1975 | Pettis | |
| 4,056,684 | 11/1977 | Lindstrom | 370/53 |
| 4,059,727 | 11/1977 | Kingswell et al. | |
| 4,086,434 | 4/1978 | Bocchi | |
| 4,147,893 | 4/1979 | Matson | |
| 4,188,593 | 2/1980 | Kaplan | 331/140 |
| 4,194,195 | 3/1980 | Merrell et al. | 340/661 |
| 4,377,862 | 3/1983 | Kofoyd et al. | 370/43 |
| 4,377,863 | 3/1983 | Legory et al. | 371/47 |
| 4,459,584 | 7/1984 | Clarkson | 340/618 |
| 4,486,625 | 12/1984 | Reinauer et al. | |
| 4,500,761 | 2/1985 | Kubota et al. | 340/618 |
| 4,583,059 | 4/1986 | Konno | 331/158 |
| 4,594,892 | 6/1986 | Asmundsson | 340/620 |
| 4,675,668 | 6/1987 | Ise et al. | 340/310 R |

FOREIGN PATENT DOCUMENTS 0013982 8/1980 European Pat. Off. .
2588983 1/1982 France .

OTHER PUBLICATIONS

Mesures. Regulation Automatisme, No. 1, Jan. 1982, pp. 7–10, 12, Paris, FR.

*Primary Examiner*—Donald J. Yusko
*Assistant Examiner*—Tyrone Queen
*Attorney, Agent, or Firm*—Wolf, Greenfield & Sacks

[57] ABSTRACT

An automatic reorder and alarm system for use with residential fuel-oil tanks which sends reorder and alarm data to a central station over the direct-dial telephone network when the fuel-oil level in the tank falls below a predetermined value or when an alarm situation, such as low temperature, occurs at the tank location. An inexpensive sensor/sending unit located at each customer tank includes a simple sensor which mounts on either the tank or an existing fuel-oil level gauge, a microcontroller circuit and a modem circuit. The microcontroller circuit uses a simple low-stability oscillator as a reference for internal operations and for modem transmission frequencies. Because the oscillator frequency cannot be precisely determined due to component tolerances and has a substantial amount of drift, a special data transmission format is used for data transmission over the telephone lines between the microcontroller and the central station. The data format consists of a selected pattern of mark and space signals in which each mark signal consists of a predetermined number of cycles of an oscillating signal whose frequency is determined by the internal modem oscillator and each space signal is an equivalent time period without a signal. At the receiver the bit time duration is determined by averaging bit times in a predetermined bit pattern header.

21 Claims, 4 Drawing Sheets

RESIDENTIAL FUEL-OIL LEVEL REPORTING AND ALARM SYSTEM

FIELD OF THE INVENTION

This invention relates to residential fuel-oil reporting systems in which a plurality of remote fuel-oil level sensors send information to a central location in response to a low fuel-oil condition or another alarm condition.

BACKGROUND OF THE INVENTION

Fuel oil which is used to heat residences and buildings is generally stored in small tanks located either inside the building, outside the building or in the ground near the building. In order to insure that an adequate supply of fuel is available to the building furnace, each residential tank must be periodically refilled by making a fuel oil delivery to the tank location Such fuel oil deliveries are presently made by a central distributor utilizing small tank trucks.

A problem arises in this rather simple supply system in that residential fuel oil tanks must be filled before the supply of fuel runs out yet it is uneconomical for the fuel oil distributor to refill the tanks on a set schedule especially during the warmer seasons in which fuel oil consumption is at a minimum. Accordingly, the present practice of fuel oil distributors is to schedule a delivery to a particular tank based on past usage history and recent weather conditions. This type of delivery is typically termed a "degree-day" system and uses mathematical algorithms to predict the amount of fuel-oil consumed by each fuel-oil user.

Unfortunately, in many residences the pattern of usage varies widely and the predictive algorithms which are used to determine when a delivery must be made are highly imprecise. Thus, it has been necessary to plan for a substantial reserve capacity for each tank, thereby reducing the amount of fuel-oil which can be delivered in each refill trip. In addition, recent trends in energy conservation practices by consumers and alternate energy sources such as solar energy have made fuel oil consumption predictions based on past history even less reliable than they have been in the past.

Consequently, fuel oil distributors have found the average amount of fuel oil delivered to the residential customers has been slowly decreasing. Since a substantial cost is incurred in personnel and equipment costs in making each delivery, the costs of operating a fuel-oil distribution center have risen substantially.

Accordingly, a number of prior art systems have been developed in order to monitor the fuel-oil level in residential tanks. Generally, these systems communicate fuel-oil level information from a remote sensing unit to a central receiving station generally by means of the direct dial telephone network. In the central receiving station the information is processed and a report is generated so that a delivery of fuel-oil can be scheduled to replenish the customer's supply before it runs out. Since the remote sensing unit is designed to report when the fuel-oil level on the customer's tank has fallen to a predetermined level, such systems insure that the fuel-oil deliveries made to the residential tanks will always be constant amounts and it is possible to reduce the tank reserve capacity and deliver larger quantities of fuel-oil on each delivery.

Two types of remote signaling systems are commonly in use. In a first type of prior art system, the central monitoring location initiates a telephone call to each remote location to gather fuel-oil information. However, when such systems are used in monitoring fuel-oil tanks located in residences, the incoming telephone call often proves annoying especially if it is at an inconvenient time. An example of such systems are shown in U.S. Pat. Nos. 3,899,639 and 4,147,893.

Accordingly, for residential use, other systems have been designed which locate a sensor/signaling unit at each residential location. This unit responds to an reorder condition created by either a sensed low fuel-oil condition at the residential location or by a timer and generates a telephone call from the residential location to the central unit after which information is transferred between the two locations. Some of these systems inconveniently immediately seize the telephone line even if a conversation is being carried on. Other systems may be arranged to test the telephone lines before use in order to avoid interrupting an ongoing call at the resident's location.

Examples of such systems are shown in U.S. Pat. Nos. 3,588,357; 3,842,208; 4,059,727 and 4,486,625. These systems can accurately monitor the residential fuel-oil level.

However, in a typical sensing system such as that described in the above patents, a single central monitoring station is in communication with a large number of sensor units. Typically, the central unit at a fuel-oil distributor's location may monitor hundreds of local fuel-oil tanks. Accordingly, it is desirable to make the remote sensing unit as inexpensive and as easy to install as possible in order to reduce the cost of tee overall system. Since there are only a few central location units however, the cost of these units can be more expensive.

Three of the chief requirements for reducing the cost of the remote sensing units are an inexpensive fuel-oil level sensor, an inexpensive mechanism to transmit information over the direct dial telephone number to the central location and a construction which allows the unit to be easily and quickly installed.

With regard to the first requirement, conventional systems often require dedicated level transducers in addition to those already present in the tank or flow meters which monitor the fuel which is used from the fuel-oil tank. Such units thus require the installer to make several connections to the fuel-oil system and increase installation time.

With regard to the second requirement, transmission over the direct dial telephone network involves a certain amount of interference and noise and, thus, any data transmission arrangement between the remote and central locations must be capable of reliably sending and receiving information in the presence of such noise.

Conventional transmission systems operate by modulating a precision carrier frequency (utilizing either frequency modulation, frequency-shift keying or pulse modulation). While such systems can operate reliably in the presence of significant amounts of noise and interference, they generally require a highly-stable oscillator at the remote location to produce the carrier signal. With present technology, such a precision, stable-frequency oscillator requires the use of expensive crystals and compensation circuitry to maintain the oscillation frequency constant even though the environment in which the oscillator is located may change substantially.

Finally, conventional systems are often time consuming to install because they require external power connections and level sensing devices must be added.

Accordingly, it is an object of the present invention to provide a fuel-oil reporting system which does not require a highly-stable oscillator.

It is another object of the present invention to provide a fuel-oil reporting system in which the remote sensing units are simple in construction and low in cost.

It is yet another object of the present invention to provide a fuel-oil reporting system which utilizes a special data transmission format that overcomes variations in the oscillator frequency in the sensing units.

It is a further object of the present invention to provide a fuel-oil reporting system which utilizes a simple and economical sensor to sense the fuel-oil level at the tank.

It is still a further object of the present invention to provide a fuel-oil reporting system which can be quickly and easily installed in new and existing tank locations.

It is yet a further object of the present invention to provide a fuel-oil reporting system which does not require an external power supply.

It is another object of the present invention to provide a fuel-oil reporting system which can report the occurrence of other alarm conditions such as low temperature or tank leaks utilizing the same transmission circuitry that is used to report fuel-oil level.

SUMMARY OF THE INVENTION

The foregoing objects are achieved and the foregoing problems are solved in one illustrative embodiment of the invention in a residential fuel-oil reporting system in which data is sent between the remote fuel-oil level sensor and the central distributor's unit by means of data encoded in a "mark" and "space" bit format which consists of a predetermined header bit pattern followed by a plurality of data bits and checksum bits. Each mark is represented by a predetermined number of cycles of a signal whose frequency is determined by a low-stability oscillator at the remote location A space consists of an equivalent time period in which no signal is transmitted. The data is received by an adaptive receiver which determines the time duration of each bit by averaging the time durations of the predetermined pattern of bits in a header portion of the data word.

The mark and space format is used to encode data indicating the state of the sensor unit and the state of the various conditions such as low fuel-oil or another alarm condition such as a fuel-tank leak, which condition is detected by an appropriate sensor.

To further reduce the cost, a simple capacitive or electromechanical sensor is used to detect the fuel oil level at the tank The capacitance sensor is constructed with a pair of concentric cylinders which, when the sensor is not in oil, have a very thin layer of air between them. The capacitance of the sensor substantially increases when the probe is submerged into oil which replaces the air dielectric between the cylinders. The fuel-oil level is detected by a dual integrator circuit which compares the probe capacitance to a reference capacitance. A difference amplifier is used to detect a difference in the slopes of the integrated output signal which difference is interpreted as a "dry" probe indicating that the level of the oil in the tank has fallen to a predetermined level. The electromechanical sensor is mounted on an existing mechanical level gauge on the tank. This latter sensor consists of a reed switch which is sensitive to a small magnet mounted on the gauge indicator, which actuates the reed switch to signal a low fuel-oil condition when the indicator reaches a predetermined location.

Other sensors which detect various alarm conditions and produce an electrical contact closure can also be used with the sensor unit.

DETAILED DESCRIPTION OF THE PREFERRED EMBODIMENT

Figure 1:
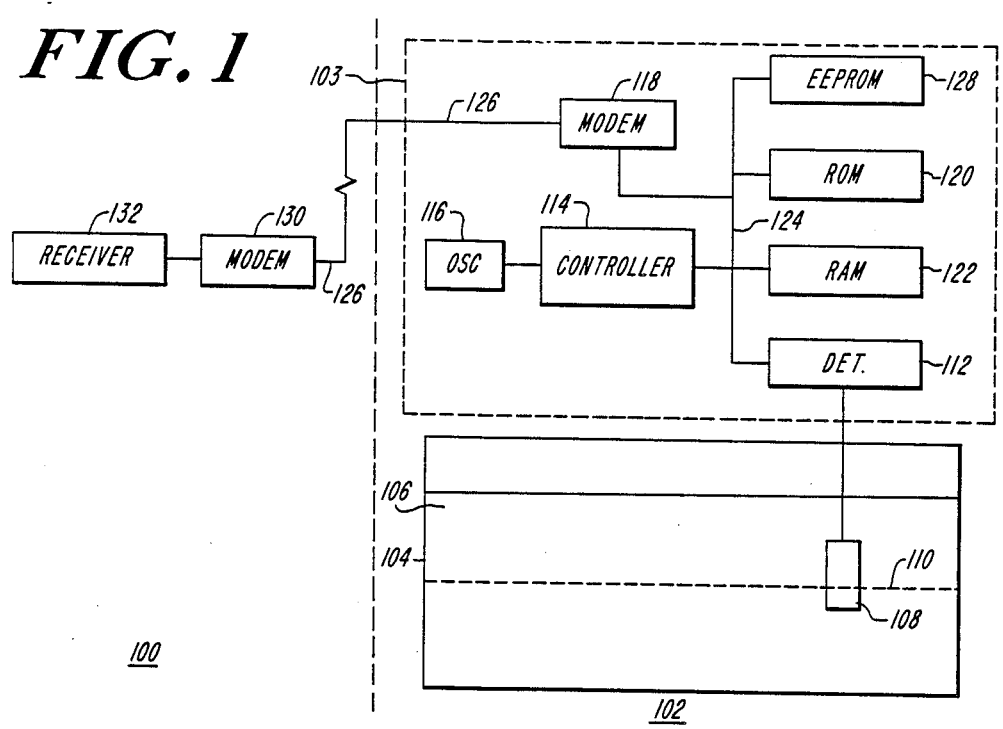
FIG. 1 is a block schematic diagram of a typical sensor and receiver unit for the inventive fuel oil reporting system.

FIG. 1 is a schematic diagram of a central receiver unit 100 connected to a remote sensor unit 102 by means of a direct dial telephone line 126. Sensor unit 102 is designed to detect the level of fuel-oil 106 in tank 104. As previously mentioned, tank 104 would be typically located at, or near, a residential premises and sensor unit 102 is, in turn, located physically on the tank.

Sensor unit 102 consists of an electronic circuitry package 103 and a capacitive sensor 108. Circuitry package 103 is located in a small, sealed box which is physically located on top of the tank. Capacitor sensor 108 hangs below the circuitry package 103 on electrical wires which pass through an opening on top of the tank and is connected to a detector circuit 112 which generates a reorder signal when the fuel-oil level in tank 104 reaches a predetermined level such as level 110.

The reorder signal generated by detector 112 is forwarded, over data bus 124, to a conventional mask-programmed microcontroller 114 which controls sensor functions and operates in accordance with instructions stored in read-only memory 120 and random-access memory 122. A microcontroller suitable for use with the illustrative embodiment is a Model COP410C microcontroller manufactured by National Semiconductor Corporation, located at 2900 Semiconductor Drive, Santa Clara, Calif. 95051.

In order to make the sensor unit easy to install, it is necessary to make the unit battery-powered. External power connections are thereby avoided. Accordingly, additional conventional power control circuitry (not shown) is provided to conserve battery power. Such circuitry may, for example, take the form of a battery disconnect switch which disconnects all of the circuitry from the battery except a timer circuit which periodically reconnects the circuitry to the battery. Upon reconnection, the sensors are checked for inputs. If inputs or alarm conditions are detected, a call is dialed and information is sent to the central location as will hereinafter be described. If no inputs or alarm conditions are detected, the circuitry re-enters a dormant state to be reawakened by the timer circuit at a later time.

The operations of microcontroller 114 are also governed by oscillator 116 which, in order to reduce costs, and, in accordance with the principals of the invention, is a simple low-stability oscillator such as a resistance/capacitance oscillator or an inexpensive crystal oscillator. Oscillator 116 is used, not only as a timing signal for microcontroller 114, but also as a signal source used to generate the carrier frequency required by modem 118 to communicate with the central location.

In accordance with another aspect of the invention, capacitance probe 108 has a simple and inexpensive construction consisting of two concentric metal cylinders of slightly different radii with an annular space between them. As the dielectric in the space changes from oil to air, the effective capacitance between the cylinders decreases linearly. This decrease in capacitance is monitored until a predetermined point has been detected indicating that the fuel-oil level has decreased to the reorder level.

Electrically eraseable programmable read-only memory (EEPROM) unit 128 is used to store various information necessary for transmission of information to the central location. For example, memory 128 stores a predetermined reorder identification number. A unique number is assigned to each separate fuel tank so that this information can be forwarded to the central location to pin-point the fuel tank location. Memory 128 also stores the telephone number of receiver 132. The identification number and telephone numbers are permanently stored in the EEPROM unit 128, however, since a memory read of EEPROM circuit consumes a significant amount of power which is at a premium in the sensor unit which is battery-powered, a single read operation is performed on the EEPROM at the time when the sensor is initially reset. The identification number information and the telephone number information retrieved from EEPROM 128 is stored in random-access memory (RAM) unit 122. Subsequently, the information is retrieved from RAM 122 which consumes much less power. Errors in the data read from RAM 122 are prevented by a conventional checksum procedure. Another read operation will only be performed again from EEPROM unit 128 if a subsequent checksum error correction procedure on the contents of RAM memory 122 indicates an error in RAM unit 122.

Sensor circuitry 102 communicates with the central receiver 132 by means of modem circuit 118. Circuit 118 includes a relay and low-pass filter for transmitting information over direct dial telephone line 126 to modem 130. Modem circuitry 118 also includes a band-pass filter and envelope detector for receiving information from modem 130. The information is passed back and forth (as will be hereinafter explained in detail) with a predetermined data format which overcomes the wide variations in the output frequency generated by oscillator 116.

Figure 2:
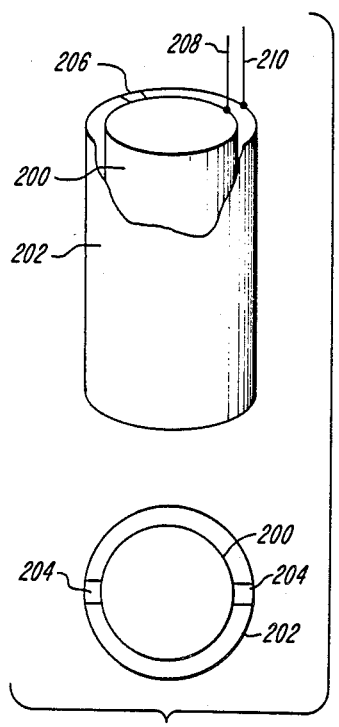
FIG. 2 is a perspective view of the capacitive sensor that is partially broken away to expose the inner cylinder.

FIG. 2 shows the perspective diagram of the capacitor sensor which has been partially cut away to reveal the inner construction. The sensor consists of two concentric cylinders, 200 and 202, which are formed of a conductive material such as brass, copper or aluminum. The cylinders are held in a concentric relationship by dielectric spacers 204 and 206 which are formed of an insulating material. The cylinders are in turn connected to detection circuitry 112 by means of wires 208 and 210. The dual-cylinder construction forms a simple but reliable sensor which can indicate when the fuel-oil level in the tank has fallen to a predetermined level. An illustrative length for the cylinders is approximately four inches and, with this length, the capacitance of the probe (when it is "dry" or not submerged in oil) is on the order of 200 picofarads. This dry capacitance nearly doubles when the probe is fully submerged in fuel-oil.

Figure 3:
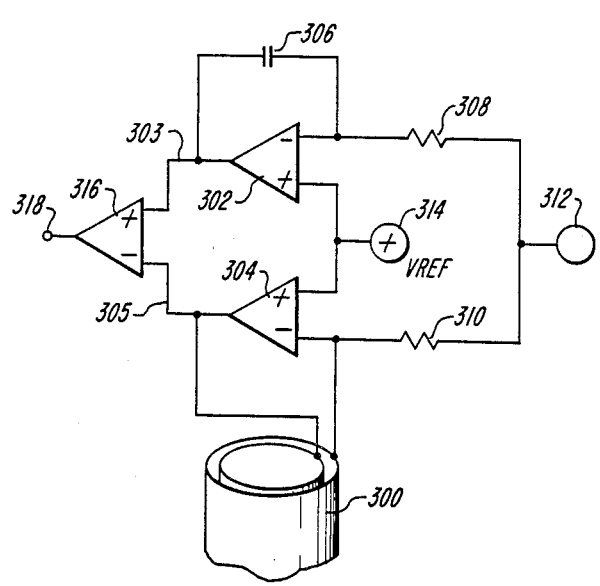
FIG. 3 is an electrical schematic diagram of the detector circuitry used with the capacitor sensor.

The detector circuit which detects a low fuel-oil condition is shown in FIG. 3 and consists of a dual integrator circuit which compares the capacitance of the probe to a reference capacitor (which illustratively has a value of 270 picofarads). When the value of the reference capacitor exceeds the value of the probe capacitance then a low oil condition is forwarded to the microcontroller.

More particularly, the detection circuit consists of two integrators 302 and 304 which are formed by using capacitive feedback around a conventional operational amplifier. An amplifier suitable for use with the illustrative embodiment is a Model LM324 manufactured by National Semiconductor Corporation, located at 2900 Semiconductor Drive, Santa Clara, Calif. 95051. The positive inputs of the amplifier circuits are connected to a reference voltage, $V_{ref}$, generated by reference voltage source 314. This voltage typically has a value approximately one-half of the supply voltage. The negative inputs of amplifiers 302 and 304 are connected by resistors 308 and 310, respectively, to control terminal 312 which is connected to a control output of microcontroller 114. By using the control output, microprocessor 114 can control the start and end of a detection cycle. A known capacitance 306 is connected across amplifier 302 and the unknown capacitance of probe 300 is connected across amplifier 304 and the outputs of the amplifiers are connected to comparator 316.

The operation of the detection circuitry is as follows: at the start of a detection cycle, microcontroller 114 places a "high" logical "1" on control terminal 312 which "high" signal provides a predetermined positive voltage to the input of the two amplifiers. Thus, at the beginning of the detection cycle, due to the capacitive feedback, the amplifiers begin integrating the control voltage provided at terminal 312 and the output voltage signals at the outputs of the amplifiers, 303 and 305, increase linearly in accordance with the well-known operation of feedback amplifiers.

As is well-known, the rate of increase of a integrator voltage output signal is directly related to the value of the feedback capacitance connected across the amplifier. In the circuit connection shown in FIG. 3, if capacitance probe 300 is dry (has air between the cylinders) then the value of the probe capacitance will be less than the value of the capacitor 306. Accordingly, the voltage output 303 will increase less rapidly than the voltage at output 305. Thus after an initial time lapse, the voltage at the output of amplifier 304 will exceed the output of amplifier 302.

The outputs of amplifiers 302 and 304 are provided as inputs to comparator 316 which compares the two signals and generates an output which is dependent on the relative values of the two input signals. Consequently, a dry capacitance probe will produce a momentary pulse which goes from ground voltage to the supply voltage towards the end of the detection period. This pulse is provided by output 318 to the microcontroller circuit 114 which sets a status flag in the data word which is sent from the sensor unit to the central receiver unit to inform the central receiver unit that the probe is dry and accordingly that the fuel oil level has fallen below the predetermined level.

Alternatively, if the capacitive probe 300 is submerged in oil then the voltage output 303 will increase more rapidly than the voltage at output 305. Thus after an initial time lapse, the voltage at the output of amplifier 302 will exceed the output of amplifier 304 and no negative pulse will be generated by comparator 316.

If the capacitive probe 300 becomes shorted by water or is otherwise faulty, the output of comparator 316 will be permanently "high", since the output of amplifier 302 will always be higher than the output of amplifier 304. This condition is detected at the microcontroller circuit and used to set an error flag that is transmitted in the data word to the central location.

Figure 4:
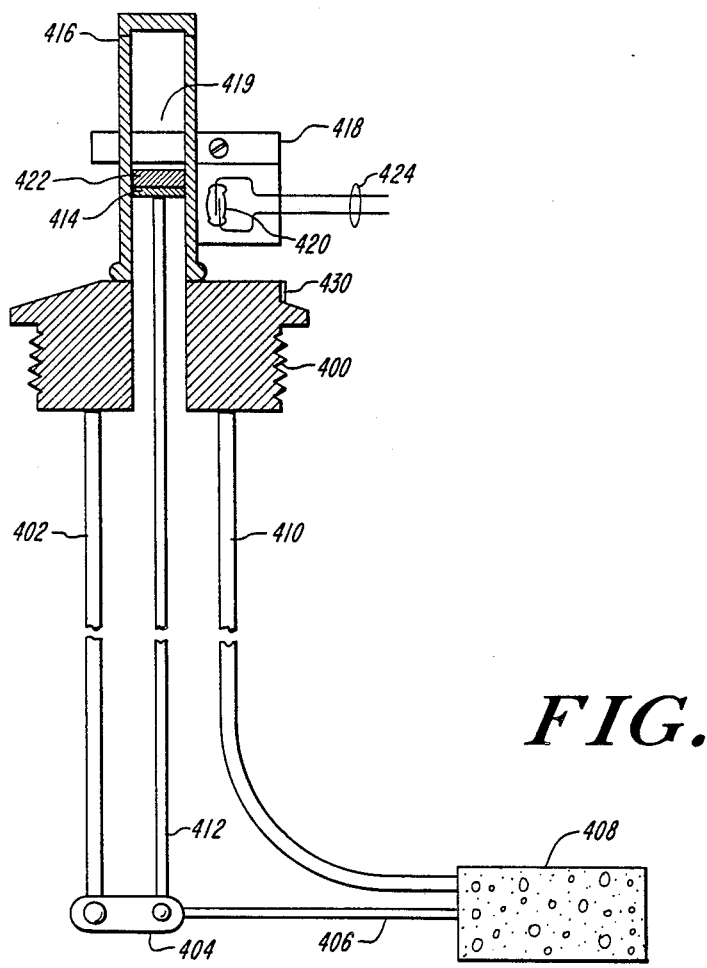
FIG. 4 is a cross-sectional schematic view of an electromechanical sensor which is shown attached to an existing mechanical level sensor.

FIG. 4 shows an alternative sensor which can be used with the illustrative sensor unit. This electromechanical sensor can advantageously be used with existing mechanical level gauges typically used on residential fuel oil tanks. These conventional gauges consist of a threaded plug 400 which screws into a gauge port provided in the tank. When plug 400 is in place in the tank, a rod 402 extends into the tank to a depth approximately ½ the maximum expected fuel-oil level. A hinge link 404 is attached to pivot about the bottom end of rod 402.

One end of an arm, 406, is rigidly attached to hinge link 404 and a float 408 is attached at the other end of arm 406. Float 408 is constructed of cork or other suitable material which floats on surface of the liquid fuel-oil. Thus, arm 406 rises and falls with the fuel oil level, pivoting about the end of rod 402 by means of hinge link 404. A siphon tube, 410, may also be attached to float 408. Siphon tube 410 is also connected to a fuel-oil withdrawal port 430 in plug 400 and allows fuel oil to be withdrawn from just below the surface of the liquid. This conventional arrangement avoids drawing fuel-oil from the bottom of the tank which fuel-oil may incorporate water or other contaminants.

A gauge rod 412 is attached to hinge link 404 by another hinged joint so that, as arm 406 moves up and down in response to the changing fuel level, gauge rod 412 is pushed up and down by hinge link 404. The upper end of gauge rod 412 slides in a clear vial 416 which extends from the top of plug 400. The top of rod 412 is provided with an indicator button 414 which can be observed through the transparent walls of vial 416. Various gauge lines marked on the walls of vial 416 mark the positions of indicator button 414 when the tank is full, partially-full and empty.

The aforementioned conventional liquid level gauge can be adapted for use with the inventive sensor unit by mounting a sensing unit 418 on gauge vial 416 by means of a clamp 419. Sensing unit 418 contains a conventional magnetic-reed switch 420 which is held in close proximity to the surface of gauge vial 416 by clamp 419.

To activate reed switch 420, a small disk magnet 422 is dropped onto the top of indicator button 414. When magnet 422 is lowered into proximity with reed switch 420, the reed contacts inside the switch close under the influence of the magnetic field. The contacts provide closed circuit over leads 424 which closure can be detected by the microcontroller in the associated sensor unit.

Since sensor unit 418 is only clamped to vial 416, it can be easily moved to set the fuel-oil level at which contact closure occurs and, thus, the level at which a reorder signal is generated. Since sensor unit 418 requires no permanent connections to the tank, it can be quickly and easily installed on an existing fuel oil tank by an ordinary serviceman without requiring special training or tools.

In addition to the two sensors described above, additional sensors may be used with the transmission circuitry to sense other conditions. Illustratively, any condition which can be sensed by a transducer that produces an electrical contact closure can be used with the system. Such sensors may illustratively include simple bimetallic temperature sensors which produce a contact closure when the ambient temperature falls above or below a predetermined value. Alternatively, a pressure switch may be used to detect a pressure drop in a double-wall pressurized tank system to detect a leak in the tank system. Any of the aforementioned conditions can be utilized to initiate an alarm call. Thus, the unit can be used to indicate failure of the heating system or of the fuel tank in situations where the building housing the tank is unoccupied for long periods of time.

In order to reduce the cost of the sensor unit 102 to a minimum, the transmission and reception circuitry in modem 118 (FIG. 1) is kept to a minimum. Thus, the circuits for receiving information from the central location in modem 118 are designed to be capable of recognizing a tone signal with only a single frequency. The single frequency tone signal is used to transmit different information by pulsing the signal and changing the duty cycle of the pulses.

Figure 5:
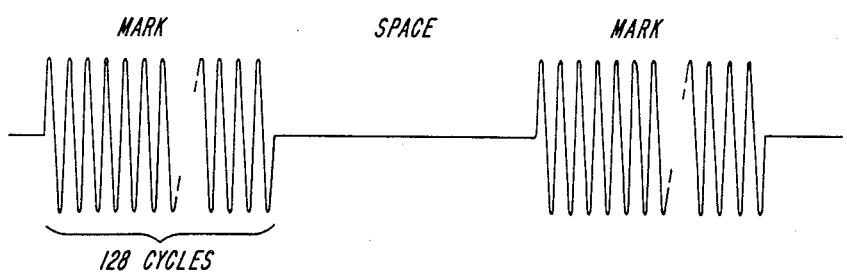
FIG. 5 is a schematic diagram of the signals used to represent MARK and SPACE bits over the data transmission path between the remote sensor and the central location.

Transmission of data from the sensor circuit 102 to the central location 100 is also carried out in a predetermined format which minimizes the effect of variations in the oscillator 116 frequency. In this arrangement, the data information is coded by means of "MARK" signals and "SPACE" signals. In the inventive transmission scheme, a MARK signal consists of 128 cycles of a sine wave with approximately a 1 KHz fundamental period as shown in FIG. 5. Due to variations in oscillator component values between sensor units and variations within the same unit caused by temperature changes, the fundamental period of the transmission sine wave can vary between 875 Hz and 1760 Hz. Accordingly, special precautions must be taken to insure accurate reception of data transmitted with such an arrangement.

A SPACE signal consists of a time period equivalent in length to a MARK signal in which no sine wave is transmitted between the sensor 102 and receiver 100.

In addition, due to the range of frequency which can be transmitted by different sensor units, the transmission baud rate is not fixed and must be determined at the start of each transmission by the receiver unit 100 by examining the data.

More particularly, in order to establish the baud rate, each data word transmitted from the sensor 102 to the receiver 100 is preceded by a header consisting of eight consecutive uninterrupted MARK signals as shown in FIG. 6. During the reception of each data word, receiver 100 times the duration of the eight MARK header interval and divides this time duration value by eight to get the time duration of each bit. This calculated bit time duration is then used to decode the remainder of the signal.

Figure 6A:
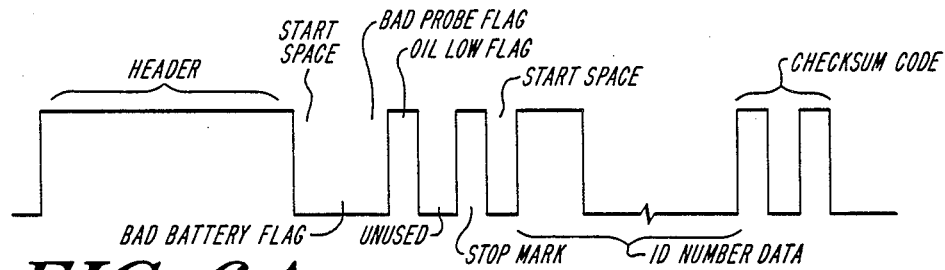
FIG. 6A is the pattern of MARK and SPACE bits used to transmit data between the sensor and the central location.

As shown in FIG. 6A, following the header portion, the data word includes 8 four-bit quantities, each of which is preceded by one start SPACE and followed by one stop MARK (these four-bit quantities are referred to as "nibbles"). After the first nibble has been received, receiver 100 uses the signal transition from each stop bit at the end of each nibble to the start bit at the beginning of the next nibble to resync itself with the data in accordance with conventional asynchronous communication operation.

The first data word nibble is a "status" nibble which consists of three flags: a "bad battery" flag, a "bad probe" flag and an "oil low" flag. Each flag consists of one bit position in the nibble which can be set to a logical "1" to indicate a "true" status or a logical "0" to indicate a false status. The bad battery flag is set by the system when a conventional battery monitoring circuit (not shown) indicates that the battery voltage has fallen below an acceptable level. This latter flag is "latched" in that it cannot be reset without removing and reapplying power to the system. Thus, an erroneous intermittent bad battery flag cannot occur.

The bad probe flag is set by the microcontroller when, as previously mentioned, the microcontroller detects a shorted or faulty probe. Similarly, the oil low flag is set by the microcontroller when the probe detection circuitry indicates that the probe is dry. The last bit position in the first nibble is not used in the illustrative embodiment.

The second nibble through the seventh nibble contain a 24-bit reorder identification number which is unique for each board and each fuel-oil tank. Coding is hexidecimal and can be used to code 16,777,216 unique identification numbers.

The final nibble in the data word contains a checksum code which is used for error correction of the reorder identification number. This checksum code is calculated from the values of the bits in nibbles 2–7. More specifically, in computing the checksum code, the microprocessor adds the bit values in nibbles 2 through 8 (ignoring the overflow out of the 4-bit sum) and confirms the result to be equal to the decimal number 15 (binary 1111). If the result of the computation does not yield this number then an error is indicated to the receiver.

Figure 6B:
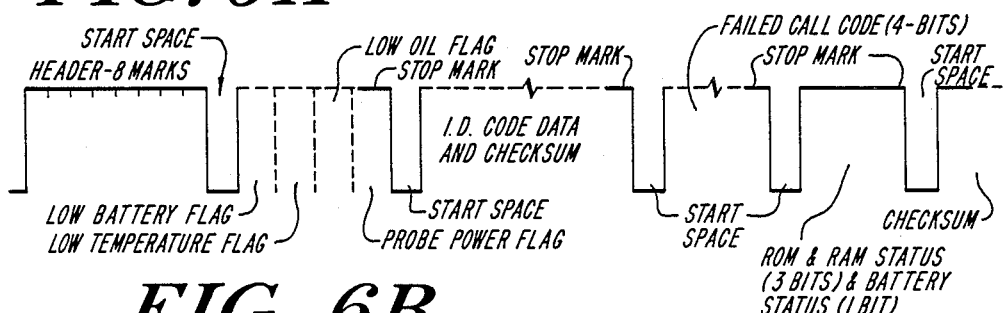
FIG. 6B is the transmission pattern of MARK and SPACE bits shown in FIG. 6A modified to accept additional alarm data.

As shown in FIG. 6B, the transmission format illustrated in FIG. 6A may also be modified to send additional information to the central receiver. More particularly, as shown in FIG. 6B, the modified data transmission format includes an eight-mark header, flag nibble, ID number, and checksum exactly as in the previously-described transmission format.

The ID number and checksum may be followed by additional data nibbles containing additional information. For example, an additional data nibble may be used to code the number of previous uncompleted attempts to send data from the remote sensor unit to the central receiver. A four bit nibble allows up to fifteen calls to be recorded. This latter information can be used by the central receiver to determine whether a problem has occurred with the communication link between the remote sensor unit and the central receiver. Additionally, another data nibble may be used to indicate the status of internal sensor unit circuitry. For example, one bit of the status nibble may be used to indicate the status of the internal memories (EEPROM and RAM) in the sensor unit. An additional bit may be used to indicate the current battery status (this indicator may be used to indicate a weak battery instead of a failed battery for which another previously-described flag bit is used).

In the format shown in FIG. 6B, an additional checksum nibble is sent which latter checksum is computed from all of the bits transmitted, including the header bits and the identification code. The checksum is used to verify that the data has been correctly sent and received.

The transmission sequence is as follows: after being energized by the aforementioned battery-saving timer, microcontroller 114 determines that a data transmission must be made to the central location when the detector 112 indicates that a bad probe condition has been encountered or that oil is needed or a battery monitor circuit (not shown) indicates that the battery voltage is low. Alternatively, another sensor may indicate another alarm condition has occurred. In response to such conditions, microcontroller 114 causes modem 118 to sample the telephone line 126 in a conventional manner so that before going off-hook, modem 118 confirms that the phone is not already in use by the owner.

If the telephone is not in use, microcontroller 114 operates a relay (not shown) in modem 118 to place the telephone line 126 in the off-hook condition. A sensor (not shown) in the modem 118 then checks for the presence of dial tone. Assuming that the dial tone is detected, the central location phone number is extracted from RAM memory 122 by controller 114 and passed to modem 118. Modem 118 pulse dials the number to cause the telephone switching circuits to connect modem 118 to modem 130 over telephone lines 126 and to apply ringing to modem 130.

To insure proper transmission, the sensor 102 and receiver 100 communicate via "handshaking" signals which inform each unit of the status of the other unit. Specifically, at receiver 132, ringing on phone line 126 alerts the receiver's microcomputer which then responds with a "receiver-answered" tone signal sent from modem 130 to modem 118. This tone signal consists of a 350-Hz signal with a 80% duty cycle (illustratively 570 milliseconds tone, 180 milliseconds no tone).

The "receiver-answered" tone signal is processed by means of conventional band-pass filter detection circuitry (not shown) in modem 118. If the proper tone is detected by modem 118, the sensor microcontroller 114 then transmits the 8-mark bit header sequence discussed above. The header sequence is followed by the data. Alternatively, if no "receiver-answered" tone signal is detected by modem 118, sensor unit 102 hangs up the telephone line by releasing the modem relay (not shown) after approximate 4 seconds.

After completing a data transmission, sensor microcontroller 114 monitors telephone line 126 for a "received OK" tone signal which is also a 350-Hz tone but with a duty cycle of 20% (illustratively 180 milliseconds tone, 570 milliseconds no tone) which indicates that data transmission has been successfully completed.

Alternatively, if any of the "handshaking" signals discussed above is not received by sensor 102, sensor microcontroller 114 releases phone line 126 and retries another data call after a predetermined time, illustratively four hours.

Figure 7:
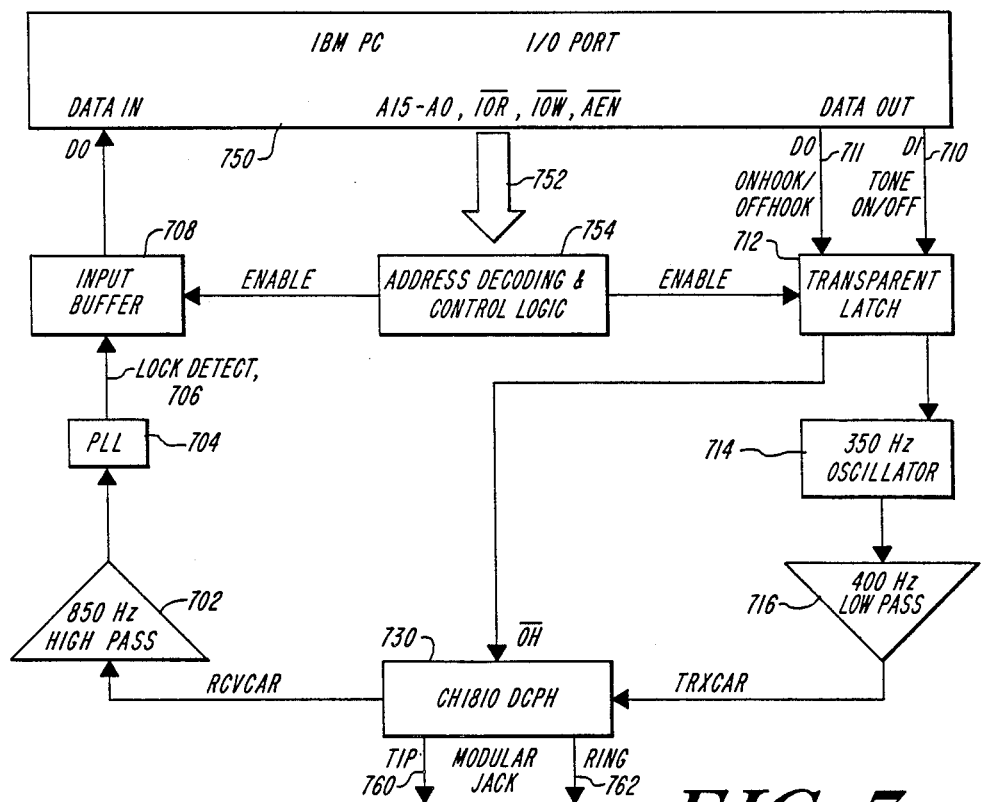
FIG. 7 is a schematic block diagram of the receiver circuitry located at the central distributor location.

FIG. 7 of the drawing shows an illustrative block diagram of the circuitry in receiver unit 100. The circuitry consists of reception circuitry including phone hybrid circuit 730, high-pass filter 702, phase locked loop circuit 704 and input buffer 708. The transmission circuitry consists of output latch 712, oscillator 714 and low-pass filter 716. The reception and transmission circuitry is controlled by a conventional computer system 750 which receives the incoming data, processes it and generates fuel-oil delivery schedules. A computer system suitable for use with the illustrative embodiment is the PC computer manufactured by the International Business Machines Corporation located in Armonk, N.Y.

More particularly, data received over phone line 126 passes through hybrid circuit 730 which is a conventional telephone hybrid circuit used for telephone line protection and which combines incoming and outgoing data information for duplex transmission over the tip and ring conductors 760 and 762 of the telephone line.

The signal resulting from incoming data is passed through high-pass filter 702 which has a cutoff frequency of 850 Hz. Filter 702 prevents high-frequency noise from interfering with the operation of phase locked loop circuit 704.

The output of filter 702 passes into a conventional phase locked loop circuit 704 which is tuned to a bandwidth including the frequencies between 825 Hz and 1780 Hz to account for the variability of the transmit frequencies among the oscillators in different sensors. The lock detect output 706 of the phase-locked loop 704 is provided to computer 750 by means of an input buffer 708 which is under control of address signals on address bus 752. The address signals are decoded by logic 754 in a conventional manner.

In response to incoming data, computer 750 generates the "receiver-answered" tone by applying an 80% duty-cycle square wave signal on data output 710 to latch 712. Latch 712 is also controlled by address decoding circuitry 754. The output of latch 712 is provided to 350-Hz oscillator 714 where it modulates the oscillator output to generate the proper tone signal.

The output of oscillator 714 is passed through a 400 Hz low-pass filter 716 to eliminate any high-frequency signals and transmitted, via hybrid circuit 730 to sensor unit 102 via telephone line 126.

Figure 8:
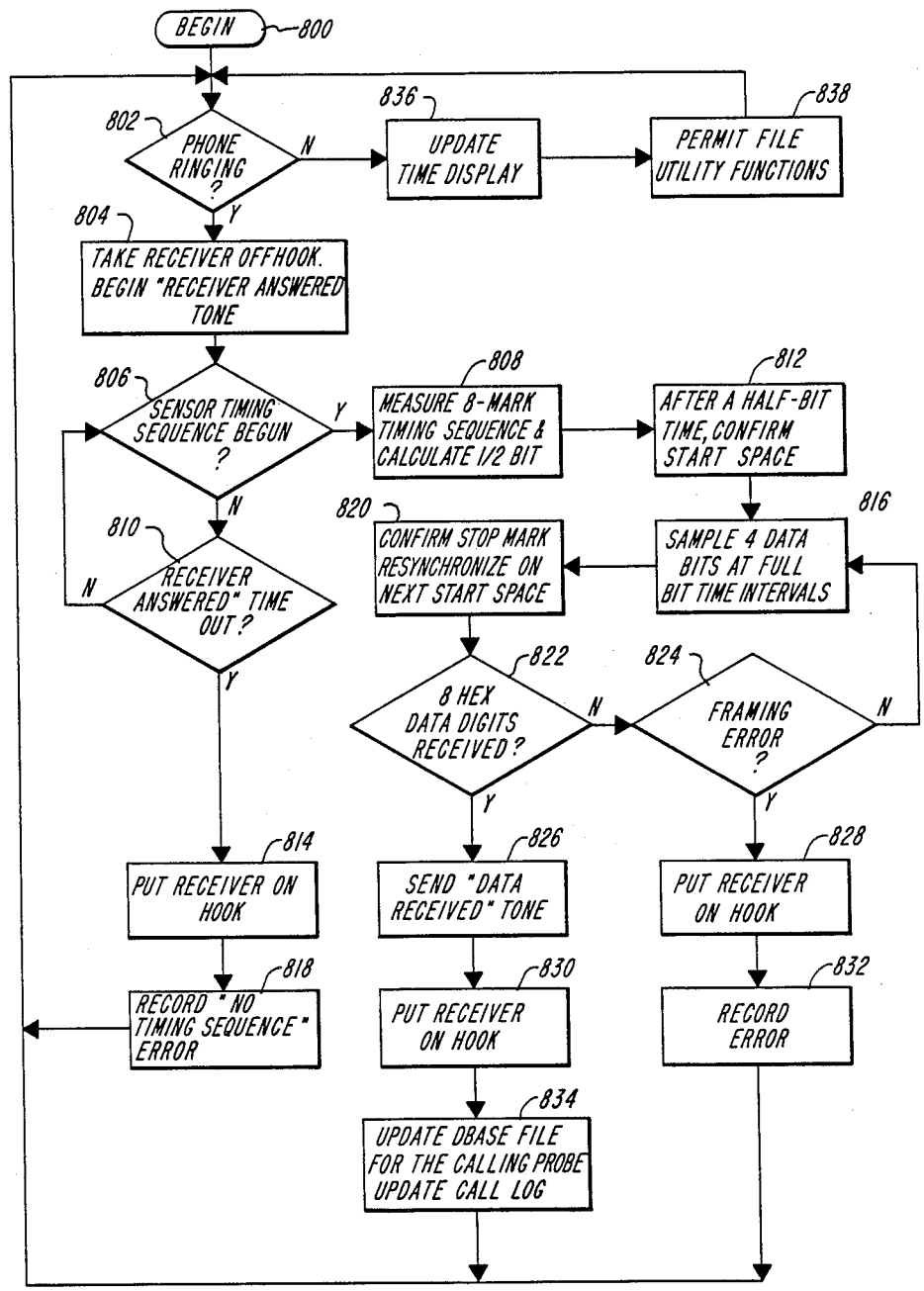
FIG. 8 is a flow chart of an illustrative computer program which processes information in the central location.

FIG. 8 shows a simplified flow chart of the computer program which is used in processor 750 located at the central receiver in order to process information received from remote sensor units and to transmit handshaking tones to the remote sensor units. The program begins in step 800 and proceeds to step 802 in which processor 750 checks for incoming ringing. On each telephone line, ringing is detected by a conventional detection circuit located in hybrid unit 730 which provides an output signal indicating to computer 750 that ringing is occurring. Processor 750 identifies lines that are ringing and selects one line by means of a conventional polling scheme.

If no ringing is detected, the routine proceeds to step 836 in which a stored time display is updated. This time display indicates the current time to the central receiver user and is also used to mark the time at which incoming calls are received.

The routine then proceeds to step 838 in which the processor is made available for general file routines and utilities and to perform general housekeeping tasks. These file routines and housekeeping functions are well-known and will not be described further herein. The routine then proceeds back to step 802 and the program again checks for ringing on the incoming phone lines.

Alternatively, if ringing is detected in step 802, the routine proceeds to step 804 in which the receiver is placed "off-hook". As previously mentioned, this operation is accomplished by processor 750 placing an appropriate signal on its D0 data output line, 711, which signal is latched in latch 712. Latch 712 there upon provides a signal to hybrid 730 which, in a conventional manner, places an impedance across the tip and ring conductors of the telephone line by means of an internal relay (not shown). This latter impedance causes the telephone switching central office to remove ringing and connect the line to the remote sensor unit. Also in step 804, processor 750 generates the "receiver-answered" tone by applying a controlled duty-cycle signal to lead 710. The signal is latched in latch 712 and used to control oscillator 714 and low-pass filter 716 to send the aforementioned "receiver-answered" tone back to the remote sensor.

The routine then proceeds to step 806 where the processor waits a predetermined time period for an incoming eight-mark timing sequence generated by the remote sensor unit. If the sequence is received, the routine proceeds to step 808. If the sequence is not received, the routine proceeds to step 810 in which an internal timer is checked for a timeout condition. If the timeout condition has not occurred, the routine proceeds back to step 806 where the incoming telephone line is checked for the timing sequence.

Alternatively, in step 810, if the timer has generated a timeout condition, indicating that the eight-mark timing sequence has not been received within the predetermined time interval, processor 750 controls hybrid circuit by means of latch 712 to place the line "on hook" by releasing the internal relay and records, in step 818, an error log which indicates that an incoming call was received but no subsequent timing sequence was received. This error log can later be reviewed by the system operator to determine whether communication problems have occurred in the system. The routine then proceeds to step 802 in which the incoming lines are again checked for ringing.

If, in step 806, the eight-mark timing sequence is detected within the timeout interval, the routine proceeds to step 808. In this step, the processor determines the total time elapsed to receive all eight marks in the timing sequence. The resulting time interval is divided by sixteen to calculate the time duration of a one-half bit time interval. This one-half bit interval is also doubled to obtain a calculated bit time interval.

The routine proceeds to step 812 in which the processor waits for a time duration equal to the previously calculated one-half bit time duration. The processor then samples the remote sensor telephone line to confirm that a start space has been received. If a start space is detected, the routine proceeds to step 816 at which the next four data bits are sampled at full bit time intervals to receive data.

The routine then proceeds to step 820 in which the processor samples the telephone line to confirm the reception of a "stop" mark signal. If the stop mark is received, the next start space is used to resynchronize the receiving equipment in a conventional manner.

The routine then proceeds to step 822 in which software routine determine if eight hex-data digits have been received by the system. If they have not, the routine proceeds to step 824 to check whether a transmission framing error has occurred by checking the positions of the start spaces and the stop marks. If no framing error has occurred, then not all of the data has been received and the routine proceeds back to step 816 in which an additional four bits are received and confirmed in steps 816 and 820.

If, in step 824, a framing error has been detected, the routine proceeds to step 828 in which processor 750 commands hybrid circuit 730 to place the line "on hook" and, in step 832, an error condition is recorded. The routine then proceeds back to step 802 in which the incoming phone lines are monitored for ringing.

Alternatively, if, in step 822, the software routines determine that eight hex-data digits have been received, the routine proceeds to step 826 to cause processor 750 to send a "data-received" tone by controlling oscillator 714 and low-pass filter 716 by means of a data signal on lead D1 (710) via latch 712.

After the "data-received" tone has been sent to the remote sensor, the routine proceeds to step 830 in which processor 750 controls hybrid circuit 730 to place the line "on hook".

In step 834, additional software updates a stored data base indicating the status of the data that has been received and a "call log" is updated to indicate another call has been properly received and data transferred. The routine then proceeds to step 802 to prepare for the reception of additional data in which incoming lines are again checked for ringing.

What is claimed is:

1. In a system for reporting a fuel-oil level in a residential tank to a central location, a sensor unit located near said tank, said sensor unit comprising:
   means located near said tank for generating a fuel-oil level sense signal,
   detector means responsive to said sense signal for producing a reorder signal when the fuel-oil in said tank reaches a predetermined level,
   an oscillator for generating an output signal, said output signal having a frequency variation, and
   controller means responsive to said reorder signal and to said output signal for transmitting a data word encoded by digital bits consisting of pulses of said output signal to said central location, said data word comprising a fixed, predetermined header pattern of bits, followed by a plurality of data bits including at least one bit indicating the status of said reorder signal and a plurality of identification number bits, said identification number bits representing an identification number unique to said sensor unit, followed by a checksum code bit pattern encoding a checksum derived by logically combining said identification number bits with each other.

2. In a fuel-oil level reporting system, the sensor unit according to claim 1 wherein said digital bits consist of a mark bit comprising a predetermined number of cycles of said single frequency signal and a space bit comprising a period of time equal to the time period of said mark in which no signal is transmitted.

3. In a fuel-oil level reporting system, the sensor unit according to claim 2 wherein said header pattern of bits comprises a predetermined number of sequential mark bits.

4. In a system for reporting a fuel-oil level in a residential tank to a central location, said tank having a mechanical level gauge attached thereto, said mechanical level gauge comprised of a movable mechanical arm with a float attached thereto, said float and arm moving in response to changes in fuel-oil level, and an indicator vial located on the outside of said tank containing an indicator button attached to said arm, a sensor unit comprising:
   a magnet attached to said indicator button,
   a magnetic reed switch located in close proximity to said gauge vial, said reed switch containing a contact which closes to indicate a low-oil condition when said magnet moves close to said reed switch,
   an oscillator for generating an output signal, said output signal having a frequency variation, and
   controller means responsive to a closure of said reed switch contact and to said output signal for transmitting a data word encoded by digital bits consisting of pulses of said output signal to said central location, said data word comprising a fixed, predetermined header pattern of bits, followed by a plurality of data bits comprising a plurality of status bits including at least one bit indicating the status of said reed switch contact and a plurality of identification number bits, said identification number bits representing an identification number unique to said sensor unit followed by a checksum code pit pattern encoding a checksum derived by logically combining said identification number bits with each other.

5. A sensor according to claim 4 further comprising a clamp unit for slidably holding said reed switch on said indicator vial.

6. In a fuel-oil level reporting system, the sensor unit according to claim 1 wherein said generating means is a capacitive sensor.

7. In a fuel-oil level reporting system, the sensor unit according to claim 6 wherein said detector means compares the capacitance of said capacitive sensor to a known capacitance.

8. In a fuel-oil level reporting system, the sensor unit according to claim 1 wherein said oscillator is a resistance/capacitance oscillator.

9. In a fuel-oil level reporting system, the sensor unit according to claim 1 wherein said oscillator is a crystal oscillator.

10. In a fuel-oil level reporting system according to claim 1 further having a mechanical fuel-oil level gauge, wherein said fuel-oil level sense signal generating means is an electrical switch controlled by said mechanical gauge.

11. In a fuel-oil level reporting system, the sensor unit according to claim 10 wherein said electrical switch is a magnetic reed switch which is controlled by a magnet attached to said mechanical gauge.

12. In a fuel-oil level reporting system, the sensor unit according to claim 1 further comprising means for sensing additional alarm conditions and for generating an alarm signal when said additional alarm conditions occur and means for encoding said alarm signal into said data word.

13. A system for reporting a fuel-oil level in a residential tank to a central location comprising:
   a sensor unit located near said tank comprising:
      means located near said tank for generating a fuel-oil level sense signal,
      detector means responsive to said sense signal for producing a reorder signal when the fuel-oil in said tank reaches a predetermined level,
      an oscillator for generating an output signal, said output signal having a frequency variation, controller means responsive to said reorder signal and to said output signal for transmitting a data word encoded by digital bits consisting of pulses of said output signal to said central location, said data word comprising a fixed, predetermined header pattern of bits, followed by a plurality of data bits followed by a checksum code bit pattern wherein said data bits comprise a plurality of status bits including at least one bit indicating the status of said reorder signal and a plurality of identification number bits, said identification number bits representing an identification number unique to said sensor unit and wherein said checksum code bit pattern encodes a checksum derived by logically combining said identification number bits with each other, a receiving unit located at said central location comprising, means for receiving said data word, means responsive to said header pattern of bits in said data word for determining the bit time duration by calculating the average time duration of the bits in said header pattern of bits.

14. A fuel-oil level reporting system according to claim 13 wherein said digital bits consist of a mark bit comprising a predetermined number of cycles of said output signal and a space bit comprising a period of time equal to the time period of said mark in which no signal is transmitted and said header pattern of bits comprises eight sequential mark bits.

15. A fuel-oil level reporting system according to claim 13 wherein said data bits comprise at least one bit indicating the status of an alarm signal indicating an alarm condition other than a low fuel-oil condition.

16. A fuel-oil level reporting system according to claim 13 wherein said checksum code bit pattern encodes a checksum derived from logically combining all bits sent in the entire transmission with each other, said bits including said header bits, identification number bits and data bits.

17. A fuel-oil level reporting system according to claim 13 wherein said fuel-oil level sense signal generating means is a capacitive sensor.

18. A fuel-oil level reporting system according to claim 13 wherein said oscillator is a resistance/capacitance oscillator.

19. A fuel-oil level reporting system according to claim 13 wherein said oscillator is a crystal oscillator.

20. A fuel-oil level reporting system according to claim 13 further having a mechanical fuel-oil level gauge, wherein said fuel-oil level sense signal generating means is a magnetic reed switch which is controlled by a magnet attached to said mechanical fuel-oil level gauge.

21. In a system for reporting an alarm condition in a remote location to a central location, a sensor unit located at said remote location, said sensor unit comprising:

detector means responsive to an alarm condition in said remote location for producing an alarm signal, an oscillator for generating an output signal, said output signal having a frequency variation, and controller means responsive to said alarm signal and to said output signal for transmitting a data word encoded by digital bits consisting of pulses of said output signal to said central location, said data word comprising a fixed, predetermined header pattern of bits, followed by a plurality of data bits including at least one bit indicating the status of said alarm signal and a plurality of identification number bits, said identification number bits representing an identification number unique to said sensor unit, followed by a checksum code bit pattern encoding a checksum derived by logically combining said identification number bits with each other.

* * * * *